United States Patent
Kurian et al.

(10) Patent No.: US 10,614,383 B2
(45) Date of Patent: Apr. 7, 2020

(54) DYNAMIC PROGRESS RECOGNITION AND RECOMMENDATIONS BASED ON MACHINE LEARNING

(71) Applicant: Bank of America Corporation, Charlotte, NC (US)

(72) Inventors: Manu Kurian, Dallas, TX (US); Matthew E. Carroll, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/574,638

(22) Filed: Sep. 18, 2019

(65) Prior Publication Data
US 2020/0012967 A1    Jan. 9, 2020

Related U.S. Application Data

(63) Continuation of application No. 15/830,175, filed on Dec. 4, 2017.

(51) Int. Cl.
| | | |
|---|---|---|
| G06K 9/00 | (2006.01) | |
| G06N 20/00 | (2019.01) | |
| G06K 9/60 | (2006.01) | |
| G02B 27/01 | (2006.01) | |

(52) U.S. Cl.
CPC ......... G06N 20/00 (2019.01); G02B 27/0172 (2013.01); G06K 9/60 (2013.01); G02B 2027/014 (2013.01); G02B 2027/0141 (2013.01)

(58) Field of Classification Search
CPC . H04L 43/0876; G06N 20/00; G06F 16/2365; G06F 16/285; G06F 16/9024
USPC .......................................................... 382/103
See application file for complete search history.

(56) References Cited

U.S. PATENT DOCUMENTS

| | | |
|---|---|---|
| 9,818,227 B2 | 11/2017 | Ur |
| 9,829,997 B2 | 11/2017 | Iwatsu et al. |
| 9,830,951 B2 | 11/2017 | Bose et al. |
| 9,832,705 B1 | 11/2017 | Newton et al. |
| 2017/0347061 A1 | 11/2017 | Wang et al. |
| 2018/0225032 A1* | 8/2018 | Jones ................. G06K 9/00456 |
| 2019/0066200 A1* | 2/2019 | Deagan .............. G06Q 30/0283 |

\* cited by examiner

*Primary Examiner* — Charlotte M Baker
(74) *Attorney, Agent, or Firm* — Banner & Witcoff, Ltd.; Michael A. Springs

(57) ABSTRACT

Systems for dynamically recognizing progress and generating recommendations are provided. In some examples, a system may image data from an augmented reality device. The image data may include video images, still images, images of machine-readable code, and the like. The received image data may be analyzed in real-time to identify an object within the data. In some examples, machine learning may be used to identify one or more characteristics of the object. The identified characteristics may be compared to one or more pre-defined goals or limits and a notification may be generated based on the comparison. The notification may be transmitted to the augmented reality device and displayed on the augmented reality device. In some examples, based on the comparison, machine learning may be used to generate one or more recommendations and a notification may be generated including the recommendations and may be transmitted to the augmented reality device for display.

26 Claims, 12 Drawing Sheets

DYNAMIC PROGRESS RECOGNITION AND RECOMMENDATIONS BASED ON MACHINE LEARNING

CROSS REFERENCE TO RELATED APPLICATIONS

This application is a continuation of and claims priority to U.S. application Ser. No. 15/830,175 filed Dec. 4, 2017, and entitled "Dynamic Progress Recognition and Recommendations Based on Machine Learning," which is incorporated herein by reference in its entirety.

BACKGROUND

Aspects of the disclosure relate to electrical computers, systems, and machine learning. In particular, one or more aspects of the disclosure relate to using machine learning to determine progress toward a pre-defined goal or limit and/or generate recommendations.

Augmented reality and augmented reality devices are becoming more common in everyday life. Augmented reality is often used to provide real-time information that would otherwise be inaccessible or difficult for a user to access. In addition, augmented reality is often used to make various process more efficient and reduce computing resources required to perform various functions. Accordingly, the use of augmented reality and augmented reality devices to track progress toward a pre-defined limit and to display recommendations maybe advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with tracking progress toward a pre-defined limit in real-time and generating and providing recommendations in real-time.

In some examples, a system, computing platform, or the like, may receive data, such as image data, from, for example, an augmented reality device of a user. The image data may include video images of one or more objects, still images of one or more objects, images of machine-readable code, and the like. In some examples, the received image data may be analyzed in real-time to identify an object within the data. In some arrangements, object recognition, optical character recognition, and the like, may be used to identify the object.

In some examples, machine learning may be used to identify or determine one or more characteristics of the object. The identified or determined characteristics may be compared to one or more pre-defined goals or limits. In some examples, a notification may be generated based on the comparison. The notification may be transmitted to the augmented reality device and displayed on the augmented reality device.

In some examples, based on the comparison, machine learning may be used to generate one or more recommendations or recommended alternatives. In some examples, a notification may be generated including the recommendations or recommended alternatives and may be transmitted to the augmented reality device for display.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using machine learning to track progress toward a pre-defined goal or limit, generate recommendations, and the like. The functions described herein may be performed in real-time or near real-time to enable or facilitate informed decisioning.

As mentioned above, augmented reality and augmented reality devices are being used to make various process more efficient, enable more informed decisioning, and the like. Accordingly, aspects described herein provide for dynamic progress recognition and recommendations using machine learning and performed using one or more augmented reality devices. In some examples, image data may be captured via an augmented reality device, such as wearable, augmented reality glasses. Various other devices may also be used without departing from the invention. The image data may include an image of one or more objects. In some examples, the image data may be analyzed to identify the one or more objects within the image data.

In some examples, machine learning may be used to identify one or more characteristics of the identified one or more objects. The characteristics may then be compared to pre-defined goals or limits, such as pre-defined spending limit for or associated with a particular category of goods or services, and a notification may be generated based on the comparison. The notification may include identification of a remaining amount toward the pre-defined goal or limit, an indication of whether purchasing the identified object would then exceed the pre-defined goal or limit, and the like.

In some examples, machine learning may be used to identify one or more recommendations or recommended alternatives (e.g., recommended alternative object) based on the comparison. The recommended alternatives or recommendations may be included in a notification. In some examples, the notification may be transmitted to the augmented reality device and displayed on the augmented reality device. For instance, the notification may be displayed on, for example, a lens of the augmented reality device, while, for example the user is simultaneously viewing the object through the lens.

These and various other arrangements will be discussed more fully below.

Figure 1A:
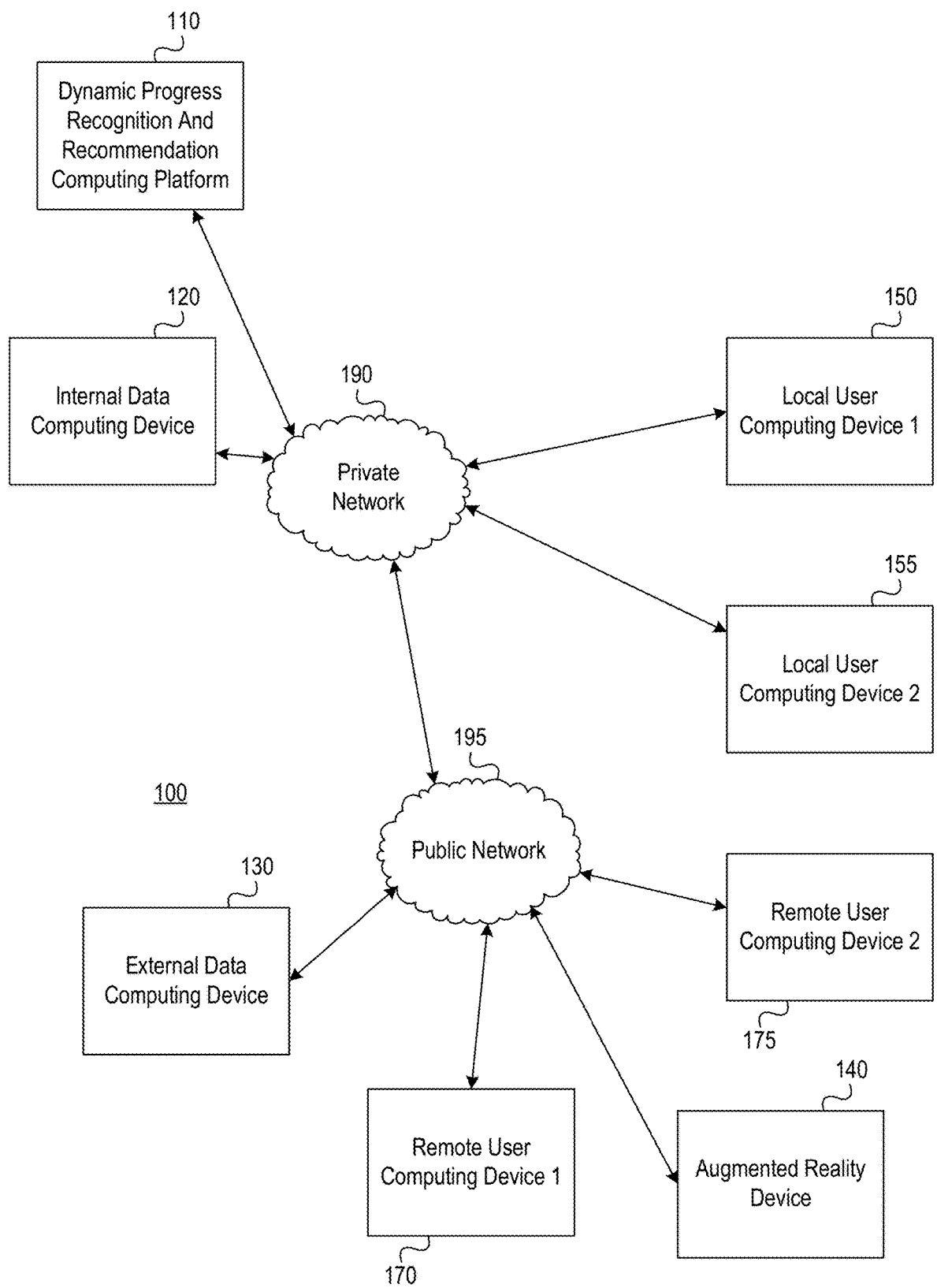
FIGS. 1A and 1B depict an illustrative computing environment for implementing dynamic progress recognition and recommendation functions in accordance with one or more aspects described herein.
Figure 1B:
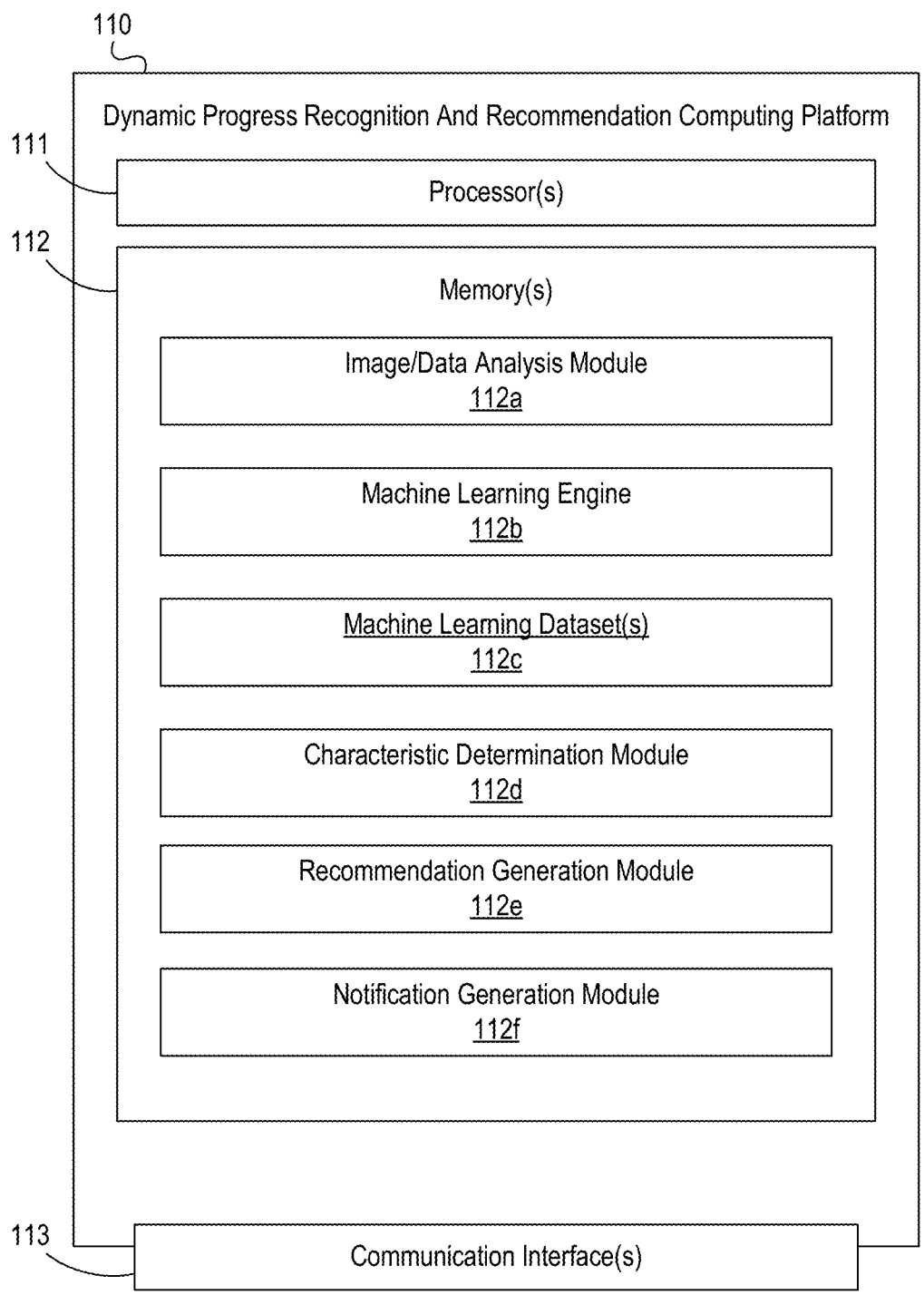

FIGS. 1A and 1B depict an illustrative computing environment for implementing and using a system for dynamically recognizing progress and providing recommendations in accordance with one or more aspects described herein. Referring to FIG. 1A, computing environment 100 may include one or more computing devices and/or other computing systems. For example, computing environment 100 may include a dynamic progress recognition and recommendation computing platform 110, an internal data computing device 120, an external data computing device 130, an augmented reality device 140, a first local user computing device 150, a second local user computing device 155, a first remote user computing device 170, and a second remote user computing device 175.

Dynamic progress recognition and recommendation computing platform 110 may be configured to host and/or execute a machine learning engine to provide dynamic progress recognition and recommendation functions. In some examples, data may be received from, for example, augmented reality device 140. The data may be image data (e.g., video, still images, or the like), may include a machine scannable code, such as a bar code, quick response code, or the like. In some examples, the data may be analyzed, e.g., in real-time or near real-time, to identify an object within the received data. For instance, image recognition software, optical character recognition software, machine readable code scanning software, or the like, may be used to identify one or more objects within the data. The dynamic progress recognition and recommendation computing platform 110 may then identify one or more characteristics of the object (e.g., price, nutritional value, or the like) and may compare the object and characteristics to one or more pre-determined or pre-defined goals, limitations, or the like, of the user. For instance, the cost of the identified object may be compared to a pre-defined budget for the user to determine whether purchasing the object would leave the user over budget.

In some examples, the dynamic progress recognition and recommendation computing platform 110 may generate a notification. In some examples, the notification may include an alternative option (e.g., a recommended alternative object) for the user. In some arrangements, the notification may then be transmitted to the augmented reality device 140 and may be displayed on the device 140.

In some examples, validation data may be received by the dynamic progress recognition and recommendation computing platform 110. For instance, the augmented reality device 140 may transmit an image of the user purchasing the object. In another example, data may be received from a system (e.g., internal data computing device 120, external data computing device 130, local user computing device 150, local user computing device 155, remote user computing device 170, remote user computing device 175, or the like) indicating that the user purchased the object, purchased the recommended alternate object, or the like. This information may then be used to update and/or validate one or more machine learning datasets.

Augmented reality device 140 may include one of various types of augmented reality devices without departing from the invention. For instance, the augmented reality device 140 may be or include a wearable device, such as augmented reality glasses. In these examples, the user may view an object through one or more clear or semi-clear lenses within the augmented reality device 140. In some examples, the augmented reality device 140 may include one or more image capture devices, such as a camera or the like. In some arrangements, the camera may capture (e.g., via a lens of the camera different from the lenses through which the user is viewing the object) object data such as images, video, or the like, while (e.g., simultaneously with) the user viewing the object through the clear or semi-clear lenses arranged in the augmented reality device 140.

In some arrangements, one or more notifications may be displayed on the clear or semi-clear lenses of the augmented reality device 140. For instance, text, images, or other data may be displayed on the lens(es) and, in some examples, may overlay or be displayed simultaneously with the viewing of the object through the clear or semi-clear lenses.

In some examples, the augmented reality device 140 may include a wearable fitness tracker, smartphone, tablet computing device, or the like, of the user.

Internal data computing device 120 may be configured to store, transmit, and/or receive data associated with one or more internal data or computer systems. For instance, an entity implementing the dynamic progress recognition and recommendation computing platform 110 may store data associated with various users, event processing device parameter information, account information, historical transaction or other user data, user behavioral information associated with a device, and the like. In some examples, this data may include purchase data that may be used to update and/or validate one or more machine learning datasets. This information may be transmitted, via the internal data computing device 120, to the dynamic progress recognition and recommendation computing platform 110 and may be used to generate or update one or more machine learning datasets, generate one or more recommended alternatives, generate a notification, and the like.

External data computing device 130 may be configured to store, transmit, and/or receive data associated with one or more data or computer systems external to the entity implementing the dynamic progress recognition and recommendation computing platform 110. For instance, data, such as publicly available data, transaction data, user demographic data, social media data, vehicle sensor data, and the like, may be transmitted, via the external data computing device 130, from one or more data or computer systems, to the dynamic progress recognition and recommendation computing platform 110 and may be used to generate or update one or more machine learning datasets, generate one or more recommended alternatives, generate a notification, and the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to control or implement aspects of the functions performed by dynamic progress recognition and recommendation computing platform 110, to establish rules or limits associated with the dynamic progress recognition and recommendation computing platform 110, to store and/or transmit data that may be used to update and/or validate one or more machine learning datasets (e.g., purchase data, user behavioral data, and the like) and the like.

The remote user computing devices 170, 175 may be used to communicate with, for example, dynamic progress recognition and recommendation computing platform 110, receive and display notifications, transmit data, such a global positioning system (GPS), sensor, or other data to the dynamic progress recognition and recommendation computing platform 110 for analysis and use in evaluating object data, identifying alternatives, updating and/or validating machine learning datasets, and the like.

In one or more arrangements, internal data computing device 120, external data computing device 130, local user computing device 150, local user computing device 155, remote user computing device 170, and/or remote user computing device 175 may be any type of computing device or combination of devices capable of performing the particular functions described herein. For example, internal data computing device 120, external data computing device 130, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal data computing device 120, external data computing device 130, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic progress recognition and recommendation computing platform 110. As illustrated in greater detail below, dynamic progress recognition and recommendation computing platform 110 may include one or more computing devices configured to perform one or more of the functions described herein. For example, dynamic progress recognition and recommendation computing platform 110 may include one or more computers (e.g., laptop computers, desktop computers, servers, server blades, or the like).

As mentioned above, computing environment 100 also may include one or more networks, which may interconnect one or more of dynamic progress recognition and recommendation computing platform 110, internal data computing device 120, external data computing device 130, augmented reality device 140, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic progress recognition and recommendation computing platform 110, internal data computing device 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic progress recognition and recommendation computing platform 110, internal data computing device 120, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., dynamic progress recognition and recommendation computing platform 110, internal data computing device 120, local user computing device 150, local user computing device 155) with one or more networks and/or computing devices that are not associated with the organization. For example, external data computing device 130, augmented reality device 140, remote user computing device 170, and/or remote user computing device 175 might not be associated with an organization that operates private network 190 (e.g., because external data computing device 130, augmented reality device 140, remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect external data computing device 130, augmented reality device 140, remote user computing device 170 and remote user computing device 175 to private network 190 and/or one or more computing devices connected thereto (e.g., dynamic progress recognition and recommendation computing platform 110, internal data computing device 120, local user computing device 150, local user computing device 155).

Referring to FIG. 1B, dynamic progress recognition and recommendation computing platform 110 may include one or more processors 111, memory 112, and communication interface 113. A data bus may interconnect processor(s) 111, memory 112, and communication interface 113. Communication interface 113 may be a network interface configured to support communication between dynamic progress recognition and recommendation computing platform 110 and one or more networks (e.g., private network 190, public network 195, or the like). Memory 112 may include one or more program modules having instructions that when executed by processor(s) 111 cause dynamic progress recognition and recommendation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic progress recognition and recommendation computing platform 110 and/or by different computing devices that may form and/or otherwise make up dynamic progress recognition and recommendation computing platform 110.

For example, memory 112 may have, store, and/or include an image/data analysis module 112a. Image/data analysis module 112a may store instructions and/or data that may cause or enable the dynamic progress recognition and recommendation computing platform 110 to receive data associated with one or more objects (e.g., via an augmented reality device 140). For instance, the image/data analysis module 112a may receive data from, for example, an image capture device of the augmented reality device 140. The data may include images, video, machine-readable codes, and the like. In some examples, the image/data analysis module 112a may analyze the received data (e.g., in real-time or near real-time) to identify one or more objects within the data. For instance, a user may capture an image of an item at a grocery store that the user is considering purchases and is being viewed through the lenses of the user's augmented reality device 140 (e.g., wearable, augmented reality glasses). The image capture device of the augmented reality device 140 may capture an image of the object being viewed through the lenses and may transmit it to the image/data analysis module 112a. The data may be analyzed to identify the object within the data (e.g., using object recognition, optical character recognition, machine-readable code scanning applications, or the like).

The dynamic progress recognition and recommendation computing platform 110 may further have, store, and/or include a machine learning engine 112b and machine learning datasets 112c. Machine learning engine 112b and machine learning datasets 112c may store instructions and/or data that cause or enable dynamic progress recognition and recommendation computing platform 110 to evaluate analyzed data (e.g., image data, identified object data, or the like) to determine characteristics of the identified object, determine whether the identified object is in keeping with pre-determined goals of the user, identify one or more alternatives or recommendations, and the like. The machine learning datasets 112c may be generated based on analyzed data (e.g., data from previously received data, data from internal data computing device 120, data from external data computing device 130, and the like), raw data, and/or received from one or more outside sources.

The machine learning engine 112b may receive data (e.g., data from internal data computing device 120, external data computing device 130, data from augmented reality device 140, analyzed data from image/data analysis module 112a, and the like) and, using one or more machine learning algorithms, may generate one or more machine learning datasets 112c. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112b may analyze data to identify patterns of activity, sequences of activity, and the like, to generate one or more machine learning datasets 112c.

The machine learning datasets 112c may include machine learning data linking one or more objects to pre-stored costs, nutritional values, behaviors, rewards, or the like. For instance, one or more objects may be linked to pre-stored characteristics of the object, such as cost, or the like. In some examples, a location of a user may also be used (e.g., particular retailer at which item is being purchased, or the like). In some examples, location information may be obtained from a user device, such as augmented reality device 140, local user computing device 150, 155, remote user computing device 170, 175, or the like.

In some examples, the machine learning datasets 112c may include machine learning data linking one or more objects, comparisons of characteristics of an object to a pre-determined goal, and the like, to one or more alternatives or recommendations. Accordingly, if a user attempts to purchase an item that is outside of the budget of the user, the machine learning datasets 112c may be used to identify a recommended alternative product.

The machine learning datasets 112c may be updated and/or validated based on subsequent data received, for example, after an object is analyzed/identified, after an alternative has been recommended, after a notification has been generated, after updating or validating data is received (e.g., after a purchase/non-purchase), or the like.

The machine learning datasets 112c may be used by, for example, a characteristic determination module 112d. Characteristic determination module 112d may store instructions and/or data that may cause or enable the dynamic progress recognition and recommendation computing platform 110 to identify one or more characteristics of an identified object. In some examples, the identified characteristics may include price or cost, nutritional value, overall value, ratings of a product, and the like.

The machine learning datasets 112c, as well as characteristics of the object determined by the characteristic determination module 112d, may also be used by recommendation generation module 112e. Recommendation generation module 112e may store instructions and/or data that may cause or enable the dynamic progress recognition and recommendation computing platform 110 to compare the identified characteristics to pre-stored goals, limits, or the like and/or to generate an indication of progress toward a goal or limit and/or a recommendation. For instance, identified characteristics of the object, such as cost, nutritional value, and the like, may be compared to pre-stored budget and/or nutritional goals to determine whether the object is in keeping with the goals. If so, the recommendation generation module 112e may recommend proceeding with purchase, consumption, or the like. Alternatively, if not, the recommendation generation module 112e may generate a recommendation for an alternative object (e.g., a lower cost version, a healthier snack, or the like).

Dynamic progress recognition and recommendation computing platform 110 may further have, store and/or include a notification generation module 112f. The notification generation module 112f may have or include instructions and/or data that may cause or enable the dynamic progress recognition and recommendation computing platform 110 to generate a notification and cause the notification to be displayed to a user. For instance, data or other notification may be generated (e.g., including an indication of progress toward a goal, a recommended alternative, or the like) and may be transmitted to a user device. For instance, the notification may be transmitted to the augmented reality device 140 and may be displayed on, for instance, the lenses of the augmented reality device 140. In some examples, the notification may overlay or be displayed simultaneously with the user viewing the object.

Figure 2A:
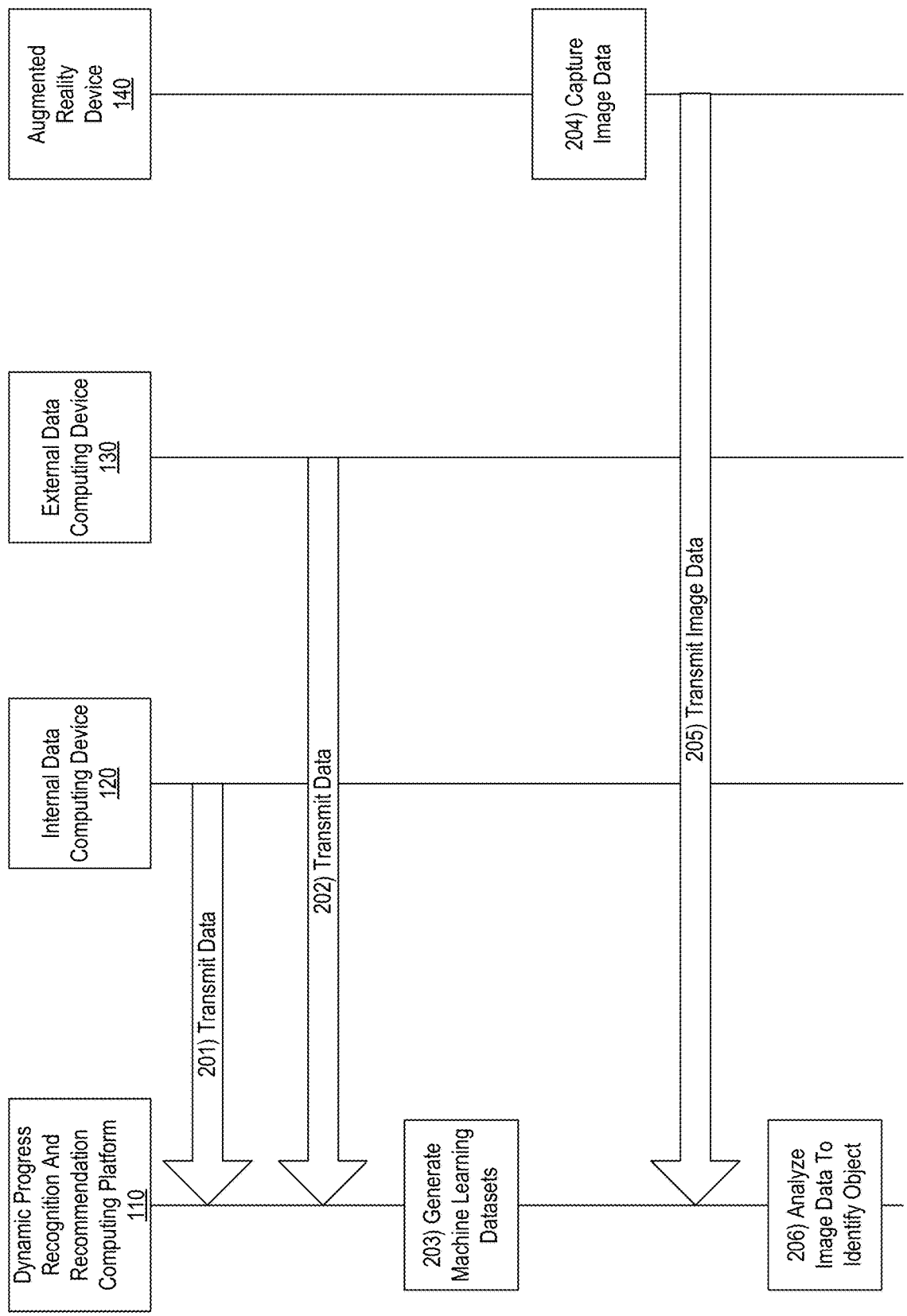
FIGS. 2A-2C depict an illustrative event sequence for implementing dynamic progress recognition and recommendation functions in accordance with one or more aspects described herein.
Figure 2B:
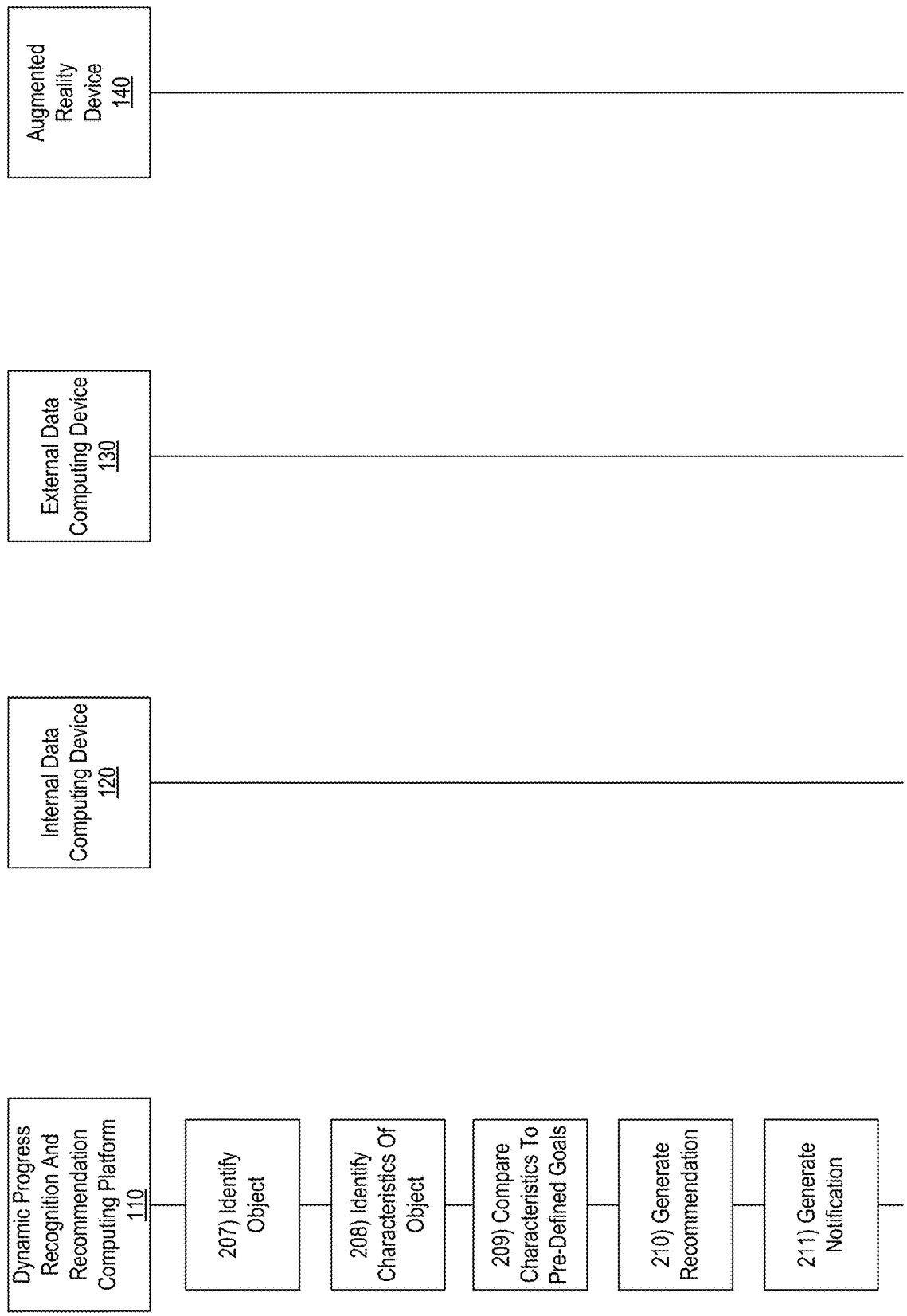
Figure 2C:
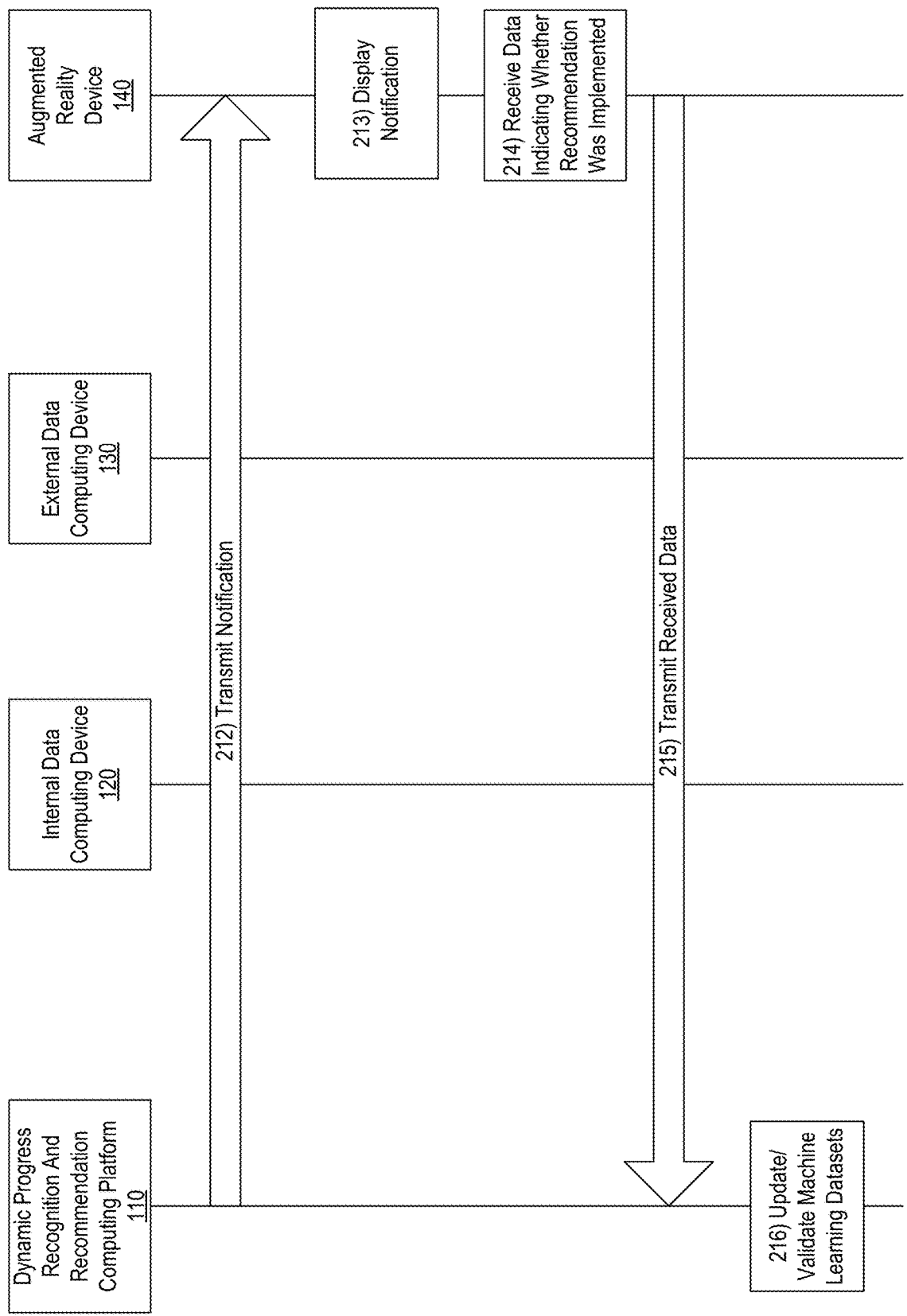

FIGS. 2A-2C depict an illustrative event sequence for implementing and using dynamic progress recognition and recommendation functions in accordance with one or more aspects described herein. The events shown in the illustrative event sequence are merely one example sequence and additional events may be added, or events may be omitted, without departing from the invention.

Referring to FIG. 2A, at step 201, data may be transmitted from, for example, internal data computing device 120. In some examples, the data may include historical data, purchase or event processing data, and the like. In step 202, data may be transmitted from external data computing device 130. In some examples, the data may include historical transaction or purchase data, nutritional information, recommendation information, and the like.

In step 203, the transmitted data may be received by the dynamic progress recognition and recommendation computing platform 110 and may be used to generate one or more machine learning datasets. In some examples, additional or alternative data may also be used to generate the machine learning datasets without departing from the invention.

In step 204, data may be captured by an augmented reality device 140. In some examples, the augmented reality device 140 may be wearable augmented reality glasses. In some arrangements, the data captured may be image data (e.g., video, still or the like) of an object, bar code, or the like. In step 205, the captured data may be transmitted to the dynamic progress recognition and recommendation computing platform 110.

In step 206, the transmitted data may be received and analyzed (e.g., in real-time or near real-time) to identify one or more objects within the image data. For instance, object recognition, optical character recognition, machine-readable code scanning applications, or the like, may be used to identify one or more objects within the data received.

With reference to FIG. 2B, in step 207, the one or more objects (e.g., objects viewed by the user through, for example, one or more clear or semi-clear lenses within the augmented reality device 140) may be identified. In step 208, one or more machine learning datasets may be used to identify one or more characteristics of the identified object. For instance, characteristics such as cost or price, nutritional value, overall value, ratings, and the like, may be determined or identified.

In step 209, the identified characteristics may be compared to one or more pre-determined goals, limits, or the like, (e.g., a pre-determined or pre-defined spending limit for a particular category of goods or services, or the like) of the user. For instance, a cost of the object may be compared to a pre-determined budget of a user to determine whether purchasing the object would be within the budget. In another example, a user may pre-determine one or more nutritional goals or limits. Accordingly, prior to purchasing an object, the system may compare the nutritional value of the object to the pre-determined nutritional goals or limits to determine whether the object is in keeping with the goals or limits.

In step 210, based on the comparison of the characteristics to the pre-determined goals or limits, one or more recommendations may be generated. For instance, the recommendation may include an indication that the cost of the object is within budget or outside of budget. In other examples, the recommendation may include a suggested alternative or alternative object (e.g., a lower cost brand, an alternate item having a greater nutritional value, or the like). In some examples, one or more machine learning datasets may be used to generate the recommendation.

In step 211, a notification may be generated. The notification may include the generated recommendation.

With reference to FIG. 2C, in step 212, the generated notification may be transmitted to, for example, the augmented reality device 140. In some examples, transmitting the notification may also include transmitting a signal, command or instruction to display the notification on the augmented reality device 140. In step 213, the notification may be displayed on the augmented reality device 140. For instance, the signal, command or instruction may be executed by the augmented reality device 140 to display the generated notification. As discussed herein, displaying the notification may include overlaying or displaying the notification simultaneously with the object being viewed by the user through the lenses of the augmented reality device 140.

In step 214, data associated with whether the recommendation was implemented may be received. For instance, the image capture device of the augmented reality device 140 may capture an image of the object being placed into a shopping cart, thereby indicating that the user has chosen to purchase the item. In another example, the augmented reality device 140 may receive user input (e.g., a tap or other selection) that the user is implementing the recommendation (e.g., to purchase the object, to purchase a recommended alternative, or the like). In still other examples, data may be received from other devices, such as internal data computing device 120, external data computing device 130, local user computing device 150, 155, remote user computing device 170, 175, or the like, indicating purchase data of the user and indicating whether the identified object was purchase/not purchases, whether any recommended alternative was purchased/not-purchased, and the like. In some examples, this data may be received from an entity associated with an event processing device used to purchase the object.

In step 215, the received data may be transmitted to the dynamic progress recognition and recommendation computing platform 110. In step 216, the data may be used to update and/or validate one or more machine learning datasets.

Figure 3A:
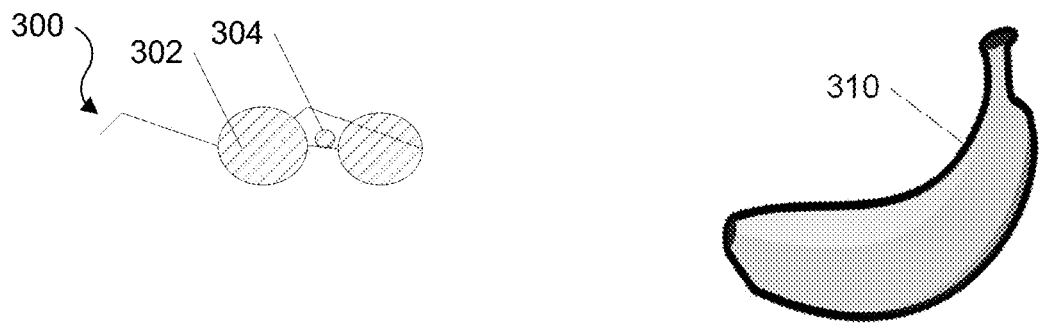
FIGS. 3A-3C illustrate one example system for implementing dynamic progress recognition and recommendation functions in accordance with one or more aspects described herein.
Figure 3B:
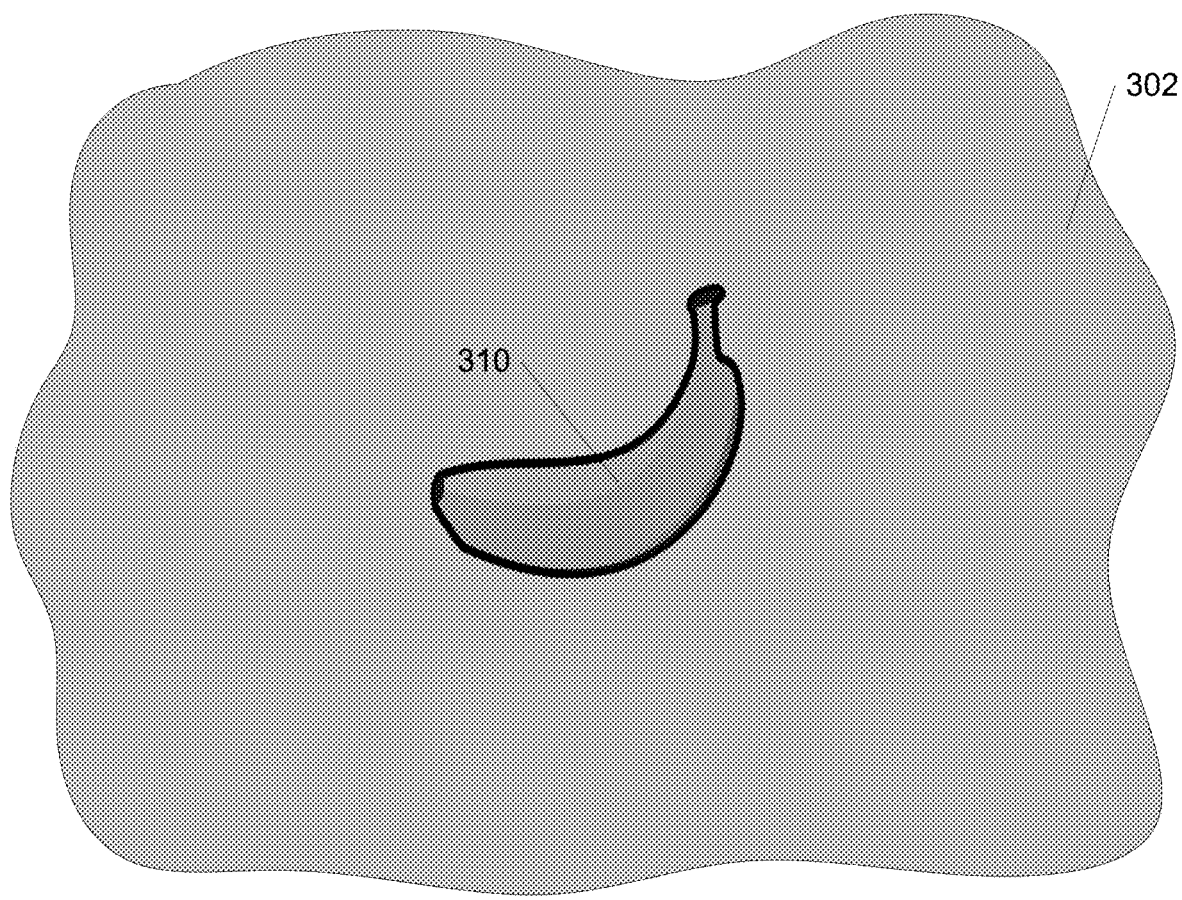
Figure 3C:
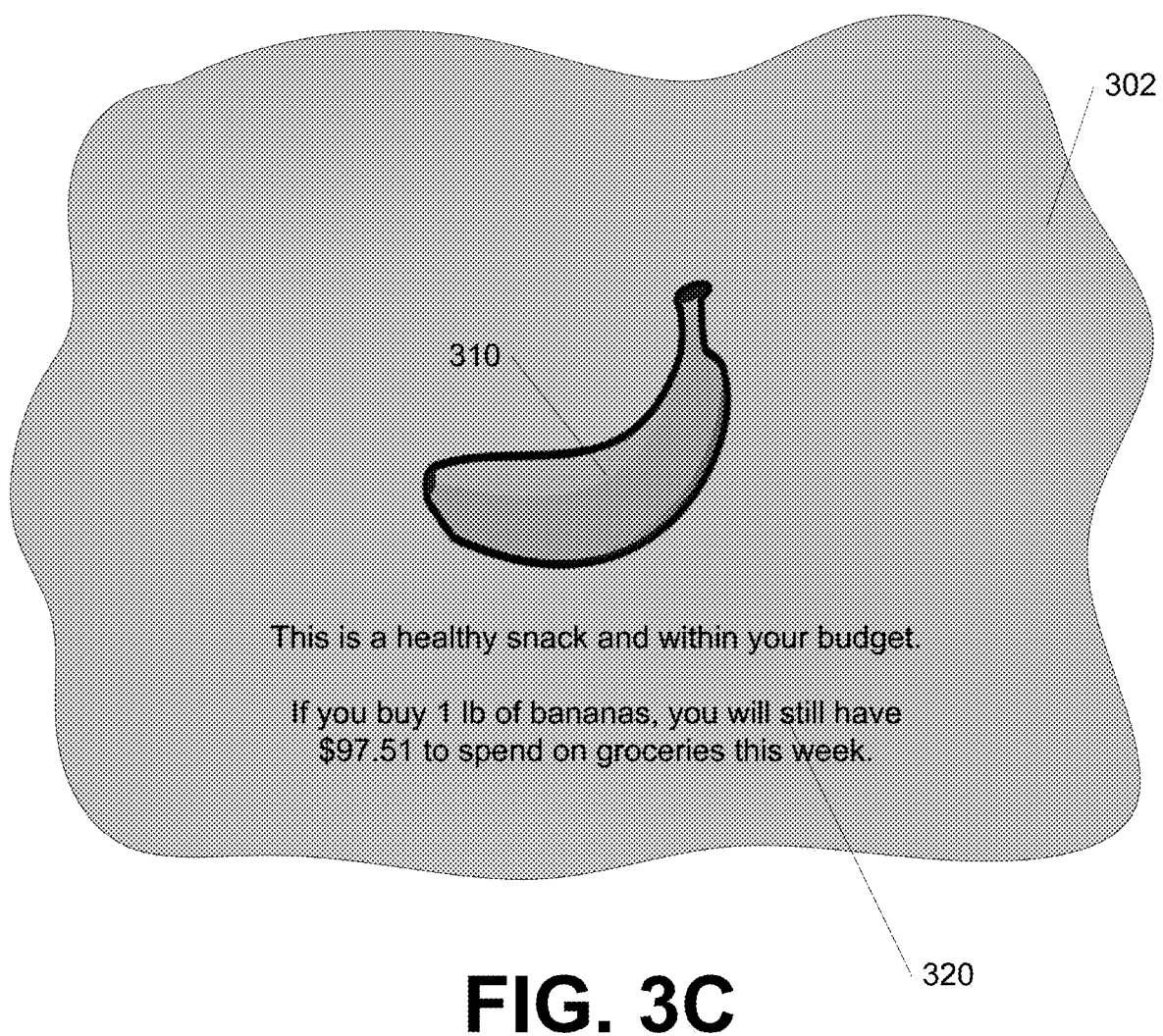

FIGS. 3A-3C illustrate one example arrangement for viewing objects though an augmented reality device to identify the object and receive a notification according to one or more aspects described herein. With reference to FIG. 3A, an augmented reality device 300 is shown. The augmented reality device 300 is shown as a wearable eyeglass style augmented reality device. However, as discussed herein, other wearable device, smartphones, tablets, and other similar devices may be used as an augmented reality device without departing from the invention.

The augmented reality device 300 includes two lenses 302 through which a user may view objects. In some examples, the lenses may be clear or semi-clear and may permit a user to view any objects without obstruction, in at least some arrangements. The augmented reality device 300 may further include an image capture device 304. The image capture device 304 may be configured to capture images, such as video, still images and the like, of the object, a bar code or other machine readable code associated with the object, text associated with the object, and the like.

A user may wear the augmented reality device 300 and may view one or more objects, such as object 310 through the lenses of the augmented reality device 300. As shown in FIG. 3B, which provides a perspective of the object 310 as viewed through the lens 302 of the augmented reality device, the user may view the object. In some examples, as the user is viewing the object through the lens 302, the image capture device 304 may captured data (e.g., images, video, or the like) of the object (e.g., via a lens associated with the image capture device and different from the lens through which the user is viewing the object. The data may then be transmitted from the augmented reality device 300 to, for example, the dynamic progress recognition and recommendation computing platform 110 for analysis, as discussed herein.

FIG. 3C again illustrates the object 310 as viewed through the lens 302 of the augmented reality device and further includes notification information 320. For instance, a notification generated, for example, by the dynamic progress recognition and recommendation computing platform 110 may be displayed on the lens 302 of the augmented reality device 300. In some examples, and as shown in FIG. 3C, the notification information may be displayed simultaneously with the user viewing the object 310 through the lens 302.

Figure 4A:
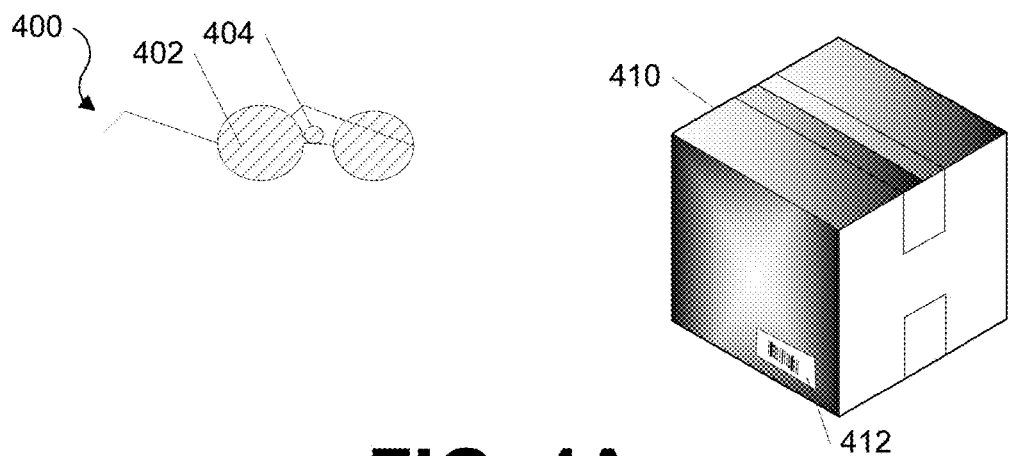
FIGS. 4A-4C illustrate another example system for implementing dynamic progress recognition and recommendation functions in accordance with one or more aspects described herein.
Figure 4B:
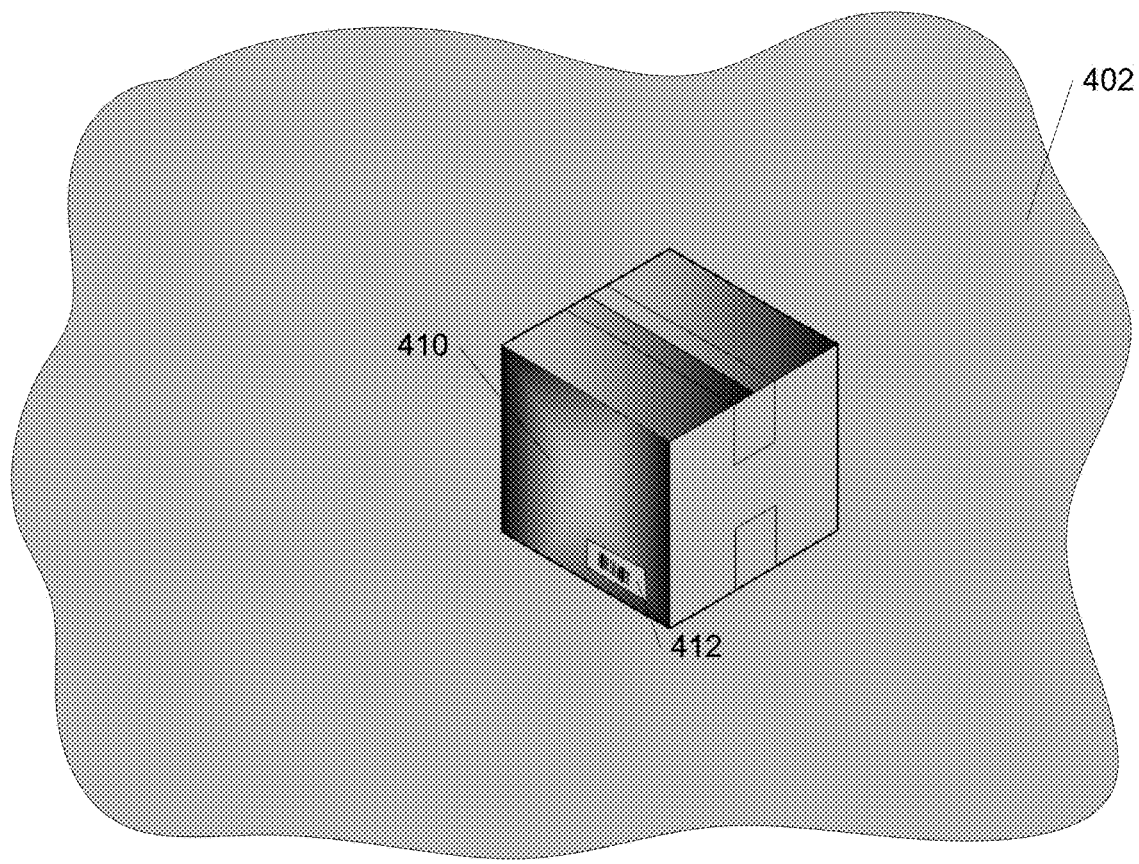
Figure 4C:
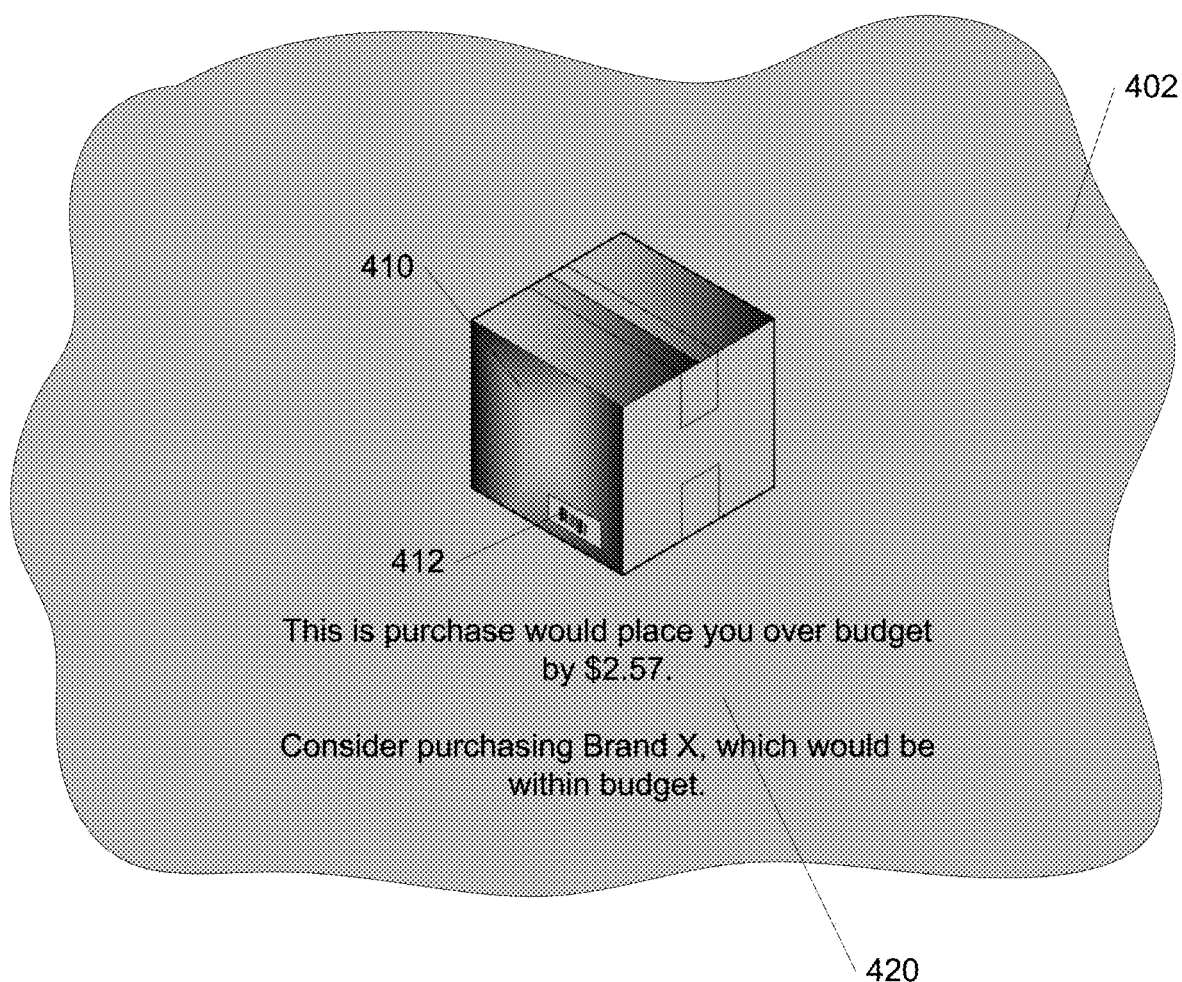

FIGS. 4A-4C illustrate another example arrangement for viewing objects though an augmented reality device to identify the object and receive a notification according to one or more aspects described herein. With reference to FIG. 4A, an augmented reality device 400 is shown. The augmented reality device 400 is shown as a wearable eyeglass style augmented reality device. However, as discussed herein, other wearable device, smartphones, tablets, and other similar devices may be used as an augmented reality device without departing from the invention.

The augmented reality device 400 includes two lenses 402 through which a user may view objects. In some examples, the lenses may be clear or semi-clear and may permit a user to view any objects without obstruction, in at least some arrangements. The augmented reality device 400 may further include an image capture device 404. The image capture device 404 may be configured to capture images, such as video, still images and the like, of the object, a bar code or other machine readable code associated with the object, text associated with the object, and the like.

A user may wear the augmented reality device 400 and may view one or more objects, such as object 410 through the lenses of the augmented reality device 400. As shown in FIG. 4B, which provides a perspective of the object 410 as viewed through the lens 402 of the augmented reality device, the user may view the object. In some examples, as the user is viewing the object 410 through the lens 402, the image capture device 404 may captured data (e.g., images, video, or the like) of the object 410 (e.g., via a lens associated with the image capture device and different from the lens through which the user is viewing the object). For instance, the image capture device 404 may capture an image of the bar code 412 on the object 410. The data (e.g., image of the bar code and/or bar code data) may then be transmitted from the augmented reality device 400 to, for example, the dynamic progress recognition and recommendation computing platform 110 for analysis, as discussed herein.

FIG. 4C again illustrates the object 410 as viewed through the lens 402 of the augmented reality device 400 and further includes notification information 420. For instance, a notification generated, for example, by the dynamic progress recognition and recommendation computing platform 110 may be displayed on the lens 402 of the augmented reality device 400. In some examples, and as shown in FIG. 4C, the notification information may be displayed simultaneously with the user viewing the object 410 through the lens 402.

Figure 5:
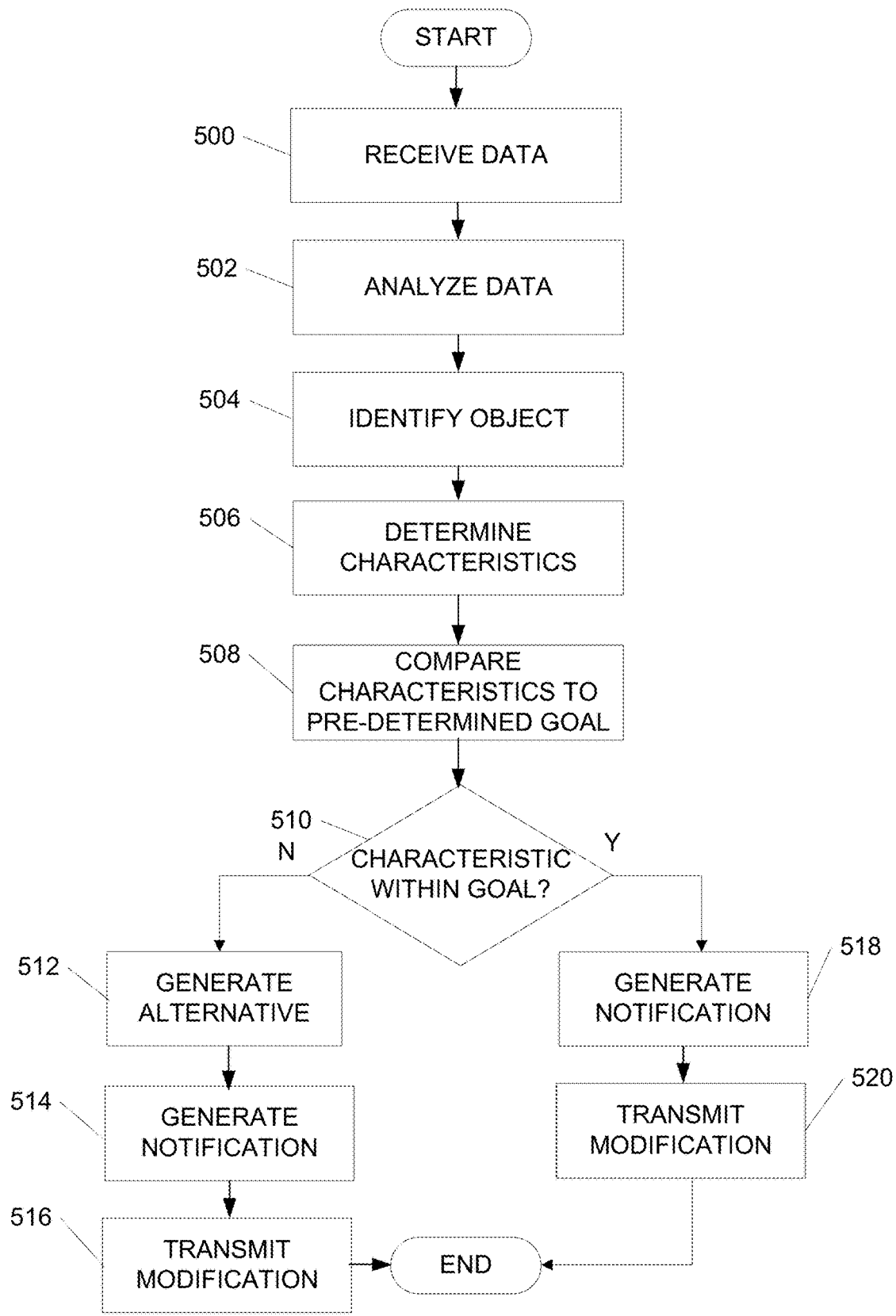
FIG. 5 depicts an illustrative method for implementing and using a system to perform dynamic progress recognition and recommendation functions, according to one or more aspects described herein.

FIG. 5 is a flow chart illustrating one example method of providing progress recognition and recommendation functions according to one or more aspects described herein. The processes illustrated in FIG. 5 are merely some example processes and functions. The steps shown may be performed in a different order, more steps may be added, or one or more steps may be omitted without departing from the invention.

In step 500, data may be received. In some examples, data may be received from, for instance, an augmented reality device, such as wearable, augmented reality glasses. In some examples, the data received may be image data including an image of an object being viewed by a user through a lens of the augmented reality device.

In step 502, the received data may be analyzed. In some examples, analyzing data may include using object recognition, optical character recognition, machine-readable code scanning, and the like, to identify an object in the image data. In step 504, the object may be identified.

In step 506, one or more machine learning datasets may be used to determine one or more characteristics of the object. For instance, machine learning may be used to determine a cost or price, a nutritional value, or the like. In step 508, the determine characteristics may be compared to one or more pre-determined goals of the user. For instance, a cost of the object may be compared to a budget of the user.

In step 510, a determination may be made as to whether the characteristic is within or in keeping with the pre-determined goal. If not, one or more machine learning datasets may be used to generate a recommendation or alternative in step 512. In step 514, a notification may be generated including the recommendation or alternative. In some examples, information associated with the pre-determined goal may also be included in the notification (e.g., a balance remaining, a running tally of amount spent toward a particular budget, or the like). In step 516, the notification may be transmitted to the augmented reality device and displayed on the augmented reality device.

If, in step 510, the characteristics is within or in keeping with the pre-determined goal, a notification may be generated in step 518. The notification may include an indication that the item is within the pre-determined goal, may include a running balance or amount remaining toward a goal or limit, or the like. In step 520, the notification may be transmitted to the augmented reality device and may be displayed by the augmented reality device.

As discussed herein, the arrangements described provide for use of machine learning datasets to identify characteristics of an identified object, compare the characteristics to a pre-defined goal or limit, generate recommendations, and the like. As discussed herein, these functions may be performed in real-time or near real-time to enable efficient, informed decisioning. The system also enables real-time or near real-time feedback to be provided to a system in order to update and/or validate one or more machine learning datasets based on whether a recommendation was implemented, whether an item was purchased, or the like.

For instance, a user may be grocery shopping and may have a weekly grocery shopping budget of $100. The user have an augmented reality device and may use the device to assist in staying within the budget by implanting aspects described herein. For instance, a user may have wearable, augmented reality glassed through which he or she views each item selected for purchase at the grocery store. As an item is viewed through the lens of the augmented reality glasses (e.g., on the shelf, as the user picks it up, or the like), image data of the object may be captured and transmitted to the progress recognition and recommendation computing platform 110 for analysis. The image data may be analyzed to identify the object in the image, determine characteristics of the object (e.g., price, nutritional value, or the like) and a determination may be made as to how purchasing the object may impact the user's budget. For example, the system may determine that purchasing the object would not exceed the weekly budget and may generate a notification for display on the lens of the augmented reality device that purchasing the object would not exceed the budget. The notification may also include a running tally of an amount projected to be spent based on other objects the user has, for example, placed in a grocery cart, basket, or the like. The running tally may aid the user in making smart financial decisions.

In some examples, if purchase of an object would exceed the $100 grocery budget, the system may generate a recommendation for an alternative purchase. For example, another brand or a generic version of the object may have a lower cost. Accordingly, the system may recommend purchase of the other brand or generic version in order to stay within budget. This information may also be displayed on the lens of the augmented reality device. In some examples, directions to the identified alternative item within the store may be generated and provided to the user (e.g., go to aisle 3, look down one shelf, or the like).

In addition, an indication may be provided to the progress recognition and recommendation computing platform of items the user purchased, whether a recommendation was implemented, and the like. For instance, a user may select a button on the augmented reality device to indicate that they are planning to move forward with a purchase. This data, coupled with image data of the object, may provide a more granular understanding of user purchasing, decisioning processes, user behaviors, and the like. This information may then be used to update and/or validate one or more machine learning datasets.

In some examples, the generated recommendations may include an incentive to not make the potential purchase, purchase an alternative item, or the like. For instance, the recommendation may include a rebate for purchasing an alternative, a discount, refund, or the like.

While various aspects discussed herein are discussed in the context of augmented reality glasses, the functions described herein may be performed using other augmented reality devices without departing from the invention. For instance, a user may capture an image of an object with, for example, a smartphone or other mobile device (e.g., using an application downloaded to the mobile device and executing thereon), a fitness tracker or other wearable device, and the like. The image data may then be analyzed and notifications may be transmitted to and displayed on the smartphone or other mobile device, fitness tracker or other wearable device, and the like.

Further, while various aspects and examples discussed herein are discussed in the context of purchases in a grocery store, the functions and aspects described herein may be used in various other contexts without departing from the invention.

For instance, aspects described herein may be used when making purchases at various retail establishments, at gas stations, and the like. Accordingly, the characteristics of the identified object may then be compared to pre-defined goals or budgets for that particular category of goods or services.

In some examples, aspects described herein may assist users in remaining on target regrading one or more nutritional goals. For instance, as a user selects food items for purchase, the nutritional value may be determined and notifications may be displayed to the user providing an indication of how this purchase may image the nutritional goals of the user (e.g., is this a healthy snack, appropriate portion sizes, gluten-free, and the like).

In some examples, aspects described herein may be used to evaluate foods a user is eating rather than purchasing. Accordingly, the system may identify foods being eaten in real-time and may generate notifications indicating whether the food is a healthy food, whether it is in keeping with nutritional goals, whether adjustments to other foods eaten throughout the day should be made, and the like. Accordingly, the system may also aid in returning a user to a path that is on target with one or more goals, even if the user has strayed from the path.

In some examples, the augmented reality device may be used to communicate with other devices in order to allocate a portion of a cost to one or more other users, accounts, or the like. For instance, if a purchase is being made by two people, the augmented reality device may transmit notifications to both parties and may generate an allocation of a cost to each party. The allocated amount may then be compared to pre-defined goals or limits, rather than an entire cost being allocated to a single user and disproportionately impacting the budget of the single user.

In some arrangements, the system may include a user registration process. The user registration process may include a user providing identifying information, determining user specific goals, limits, budgets, or the like. In some examples, the user may customize one or more aspects, such as how much over budget a purchase can be before a notification is transmitted, a threshold proximity to a budget at which a notification is transmitted, and the like.

In some examples, if a user has an unexpected expense, the system may modify one or more goals or budgets to account for the expense. Accordingly, the system may generate notifications reminding the user of the unexpected expense, adjusted budget, or the like, in order to aid the user in recovering financial from the unexpected expense.

Figure 6:
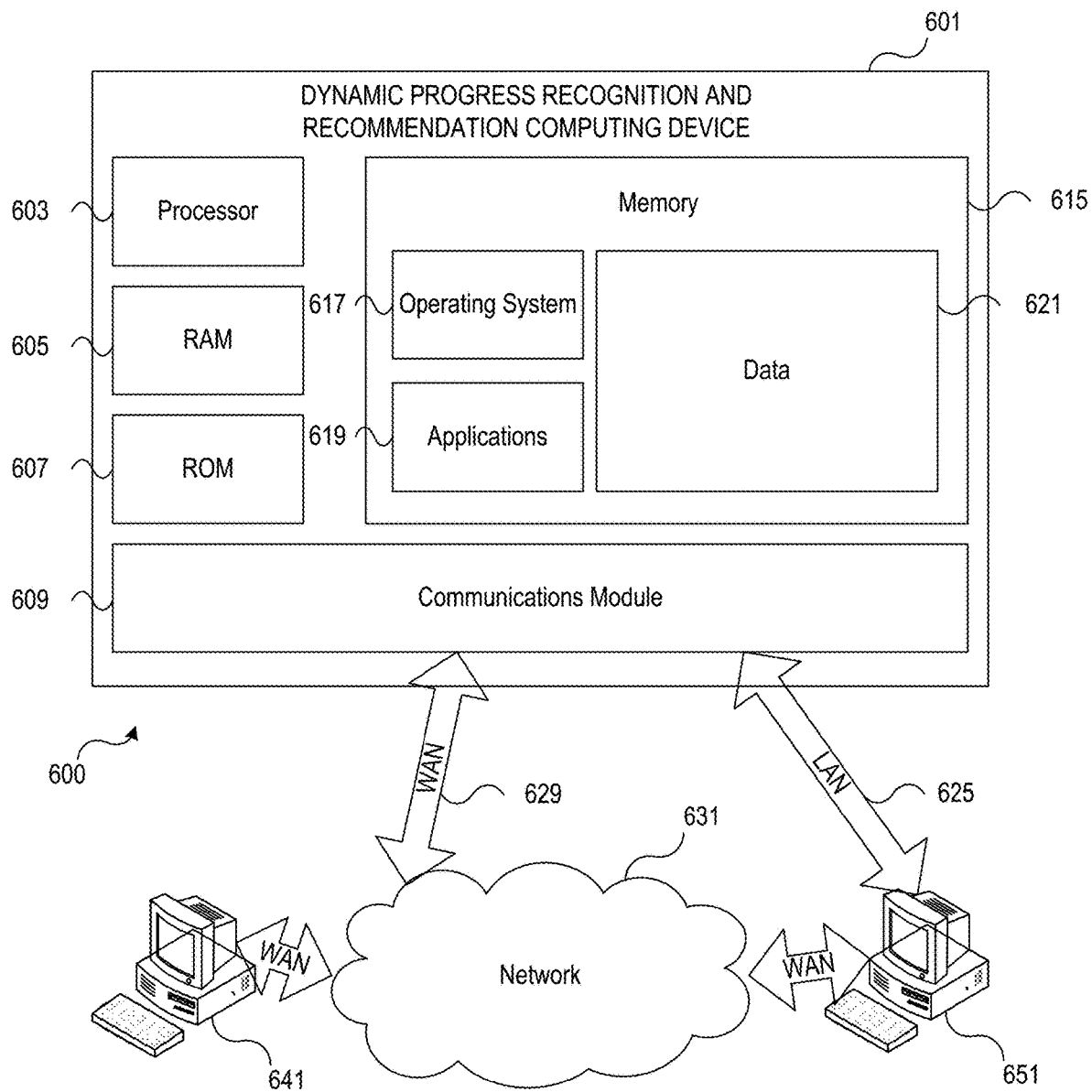
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include dynamic progress recognition and recommendation computing device 601 having processor 603 for controlling overall operation of dynamic progress recognition and recommendation computing device 601 and its associated components, including Random Access Memory (RAM) 605, Read-Only Memory (ROM) 607, communications module 609, and memory 615. Dynamic progress recognition and recommendation computing device 601 may include a variety of computer readable media. Computer readable media may be any available media that may be accessed by dynamic progress recognition and recommendation computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic progress recognition and recommendation computing device 601. Such a processor may execute computer-executable instructions stored on a computer-readable medium.

Software may be stored within memory 615 and/or storage to provide instructions to processor 603 for enabling dynamic progress recognition and recommendation computing device 601 to perform various functions as discussed herein. For example, memory 615 may store software used by dynamic progress recognition and recommendation computing device 601, such as operating system 617, application programs 619, and associated database 621. Also, some or all of the computer executable instructions for dynamic progress recognition and recommendation computing device 601 may be embodied in hardware or firmware. Although not shown, RAM 605 may include one or more applications representing the application data stored in RAM 605 while dynamic progress recognition and recommendation computing device 601 is on and corresponding software applications (e.g., software tasks) are running on dynamic progress recognition and recommendation computing device 601.

Communications module 609 may include a microphone, keypad, touch screen, and/or stylus through which a user of dynamic progress recognition and recommendation computing device 601 may provide input, and may also include one or more of a speaker for providing audio output and a video display device for providing textual, audiovisual and/or graphical output. Computing system environment 600 may also include optical scanners (not shown).

Dynamic progress recognition and recommendation computing device 601 may operate in a networked environment supporting connections to one or more remote computing devices, such as computing devices 641 and 651. Computing devices 641 and 651 may be personal computing devices or servers that include any or all of the elements described above relative to dynamic progress recognition and recommendation computing device 601.

The network connections depicted in FIG. 6 may include Local Area Network (LAN) 625 and Wide Area Network (WAN) 629, as well as other networks. When used in a LAN networking environment, dynamic progress recognition and recommendation computing device 601 may be connected to LAN 625 through a network interface or adapter in communications module 609. When used in a WAN networking environment, dynamic progress recognition and recommendation computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 7:
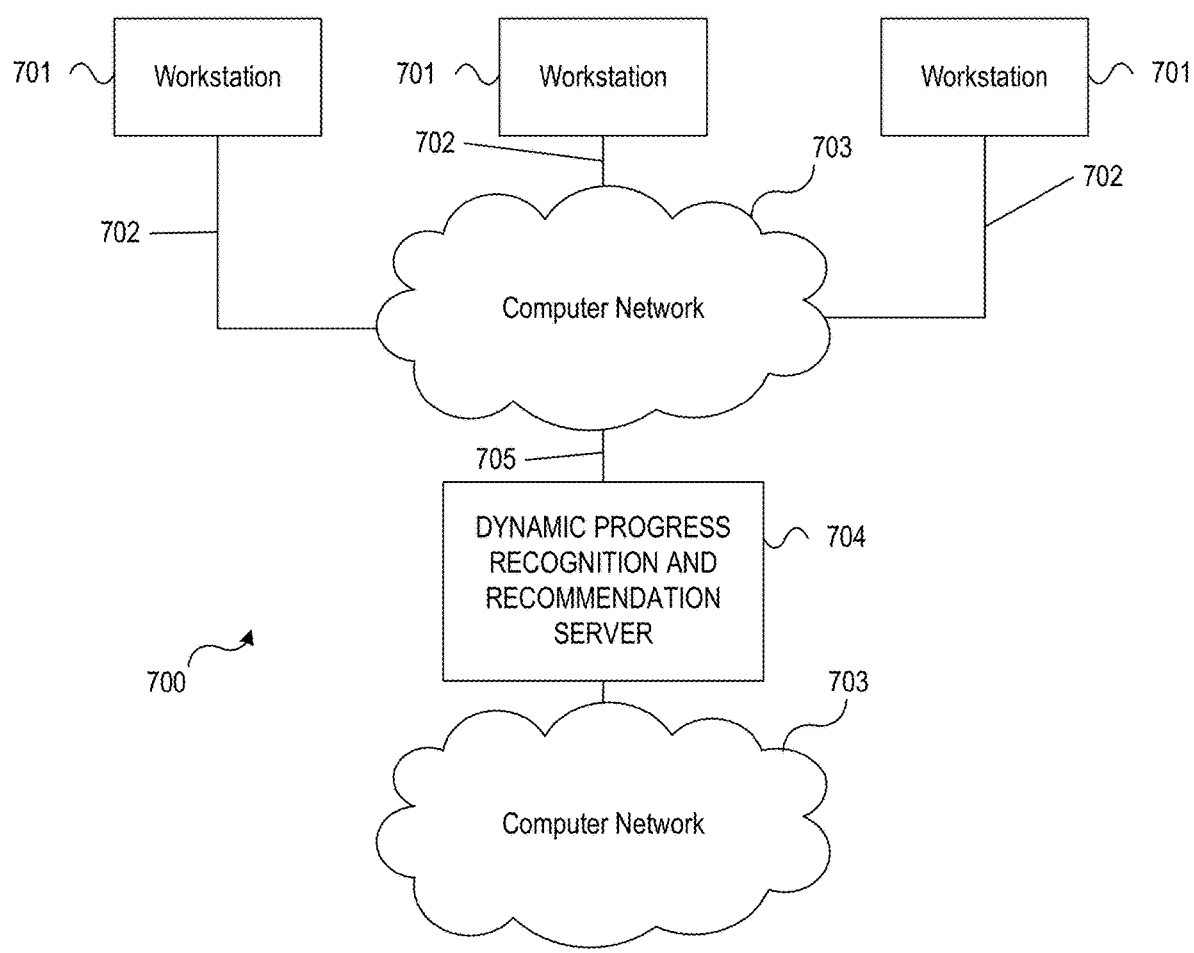
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to dynamic progress recognition and recommendation server 704. In system 700, dynamic progress recognition and recommendation server 704 may be a server, processor, computer, or data processing device, or combination of the same, configured to perform the functions and/or processes described herein. Server 704 may be used to receive data, analyze received data, identify an object, determine characteristics of the object, compare the determined characteristics to pre-determined goals or limits, generate a recommendation, generate a notification, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and dynamic progress recognition and recommendation server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A system, comprising:
an augmented reality device of a user; and
a dynamic progress recognition and recommendation computing platform in communication with the augmented reality device, the dynamic progress recognition and recommendation computing platform, comprising:
    at least one processor;
    a communication interface communicatively coupled to the at least one processor; and
    memory storing computer-readable instructions that, when executed by the at least one processor, cause the dynamic progress recognition and recommendation computing platform to:
        receive, from the augmented reality device of the user, image data;
        analyze, in real-time, the image data using at least one of: object recognition and optical character recognition to identify an object within the image;
        determine, using one or more machine learning datasets, at least one characteristic of the identified object;
        compare the determined at least one characteristic of the identified object to a pre-defined goal of the user;
        determine, based on the comparing, whether the at least one characteristic is within parameters of the pre-defined goal of the user;
        responsive to determining that the at least one characteristic is within the parameters of the pre-defined goal of the user, generate a first notification including a progress toward the pre-defined goal of the user; and
        transmit the generated first notification to the augmented reality device of the user.

2. The system of claim 1, further including instructions that, when executed, cause the dynamic progress recognition and recommendation computing platform to:
    responsive to determining that the at least one characteristic is not within parameters of the pre-defined goal of the user, identify, based on the comparing and the one or more machine learning datasets, a recommended alternative object to the identified object; and
    generate a second notification including the recommended alternative object.

3. The system of claim 2, further including instructions that, when executed, cause the dynamic progress recognition and recommendation computing platform to:
    receive, from the augmented reality device of the user, data indicating whether the recommended alternative object was accepted; and
    updating the one or more machine learning datasets based on the data indicating whether the recommended alternative object was accepted.

4. The system of claim 1, further including instructions that, when executed, cause the dynamic progress recognition and recommendation computing platform to:

cause the generated first notification to be displayed on the augmented reality device of the user.

5. The system of claim 1, wherein the image data is at least one of: video images and still images.

6. The system of claim 1, wherein the image data includes an image of a machine-readable code arranged on the object.

7. The system of claim 1, wherein the augmented reality device is a wearable device.

8. The system of claim 7, wherein the augmented reality device includes augmented reality glasses.

9. The system of claim 1, wherein the at least one characteristic is at least one of: price and nutritional value.

10. The system of claim 1, wherein the pre-defined goal of the user is a budget associated with a category of goods.

11. A method, comprising:
at a computing platform comprising at least one processor, memory, and a communication interface:
receiving, by the at least one processor and from an augmented reality device of a user via the communication interface, image data;
analyzing, in real-time and by the at least one processor, the image data using at least one of: object recognition and optical character recognition to identify an object within the image;
determining, by the at least one processor and using one or more machine learning datasets, at least one characteristic of the identified object;
comparing, by the at least one processor, the determined at least one characteristic of the identified object to a pre-defined goal of the user;
determining, based on the comparing, whether the at least one characteristic is within parameters of the pre-defined goal of the user;
if it is determined that the at least one characteristic is within the parameters of the pre-defined goal of the user, generating a first notification including a progress toward the pre-defined goal of the user; and
transmitting, by the at least one processor, the generated first notification to the augmented reality device of the user.

12. The method of claim 11, further including:
if it is determined that the at least one characteristic is not within parameters of the pre-defined goal of the user, identifying, by the at least one processor and based on the comparing and the one or more machine learning datasets, a recommended alternative object to the identified object; and
generating, by the at least one processor, a second notification including the recommended alternative object.

13. The method of claim 11, further including:
causing, by the at least one processor, the generated first notification to be displayed on the augmented reality device of the user.

14. The method of claim 11, wherein the image data includes at least one of: video images and still images.

15. The method of claim 11, wherein the image data includes an image of a machine-readable code arranged on the object.

16. The method of claim 11, wherein the augmented reality device includes augmented reality glasses.

17. The method of claim 11, wherein the at least one characteristic is at least one of: price and nutritional value.

18. The method of claim 11, wherein the pre-defined goal of the user is a budget associated with a category of goods.

19. One or more non-transitory computer-readable media storing instructions that, when executed by a computing platform comprising at least one processor, memory, and a communication interface, cause the computing platform to:
receive, from an augmented reality device of a user, image data;
analyze, in real-time, the image data using at least one of: object recognition and optical character recognition to identify an object within the image;
determine, using one or more machine learning datasets, at least one characteristic of the identified object;
compare the determined at least one characteristic of the identified object to a pre-defined goal of the user;
determine, based on the comparing, whether the at least one characteristic is within parameters of the pre-defined goal of the user;
responsive to determining that the at least one characteristic is within the parameters of the pre-defined goal of the user, generate a first notification including a progress toward the pre-defined goal of the user; and
transmit the generated first notification to the augmented reality device of the user.

20. The one or more non-transitory computer-readable media of claim 19, further including instructions that, when executed, cause the computing platform to:
responsive to determining that the at least one characteristic is not within parameters of the pre-defined goal of the user, identify, based on the comparing and the one or more machine learning datasets, a recommended alternative object to the identified object; and
generate a second notification including the recommended alternative object.

21. The one or more non-transitory computer-readable media of claim 19, further including instructions that, when executed, cause the computing platform to:
cause the generated first notification to be displayed on the augmented reality device of the user.

22. The one or more non-transitory computer-readable media of claim 19, wherein the image data includes at least one of: video images, still images and an image of a machine-readable code.

23. The one or more non-transitory computer-readable media of claim 19, wherein the augmented reality device is a wearable device.

24. The one or more non-transitory computer-readable media of claim 23, wherein the augmented reality device includes augmented reality glasses.

25. The one or more non-transitory computer-readable media of claim 19, wherein the at least one characteristic is at least one of: price and nutritional value.

26. The one or more non-transitory computer-readable media of claim 19, wherein the pre-defined goal of the user is a budget associated with a category of goods.

* * * * *